455-115 SR

FIP8102 OR 3,806,809

United States Patent [19]

Firman

[11] 3,806,809

[45] Apr. 23, 1974

[54] HIGH FREQUENCY INTERFERENCE SIMULATOR AND METHOD OF IDENTIFYING CAUSATION OF UNDESIRED NON-LINEAR INTERMODULATION INTERFERENCE

[75] Inventor: Carl M. Firman, San Diego, Calif.

[73] Assignee: The United States of America as represented by the Secretary of the Navy, Washington, D.C.

[22] Filed: Nov. 9, 1972

[21] Appl. No.: 305,190

[52] U.S. Cl. .................... 325/133, 325/363, 324/81

[51] Int. Cl. .......................................... G01r 23/00

[58] Field of Search .......... 325/133, 134, 154, 156, 325/65, 67; 324/128, 81, 77 C, 78 F

[56] References Cited

UNITED STATES PATENTS

| | | | |
|---|---|---|---|
| 2,597,358 | 3/1942 | McCouch et al. | 325/301 |
| 3,049,667 | 8/1962 | Broadhead et al. | 324/81 |
| 3,188,566 | 6/1965 | Bullene | 324/128 |
| 3,667,051 | 5/1972 | Barstow | 325/363 |

*Primary Examiner*—Benedict V. Safourek
*Attorney, Agent, or Firm*—R. S. Sciascia; G. J. Rubens; J. W. McLaren

[57] ABSTRACT

The primary causation of undesired non-linear intermodulation interference developed from a plurality of known radio frequency sources is determined by the method and process of generating commensurate derivative signals from each of the known radio frequency sources, non-linearly amplifying and mixing the derivative signals to produce composite signals containing spectrally expanded frequencies, separating the frequency components of the composite signals for indicating the amplitude of each component, and then separately disconnecting each derivation signal in turn to identify which of the plurality of known radio frequency sources causes the unwanted intermodulation interference at a particular selected frequency.

The new method and process may be implemented by apparatus such as a current transformer electromagnetically coupled to each of the known radio frequency sources, and amplified by a broadband non-linear amplifier which also mixes the signals as well as spectrally expanding their frequency content; a multiple switch means connecting the derivative signals as inputs to the non-linear amplifier is preferably adapted for selectively disconnecting each of the derivative signals in turn. Broadband frequency response means receives the resultant outputs of the amplifier and separately indicates the amplitude of each discrete frequency component. Disconnection of each derivative signal in turn identifies which of the known radio frequency sources contributes significantly to the undesired intermodulation interference at any particular selected frequency of concern.

6 Claims, 3 Drawing Figures

HIGH FREQUENCY INTERFERENCE SIMULATOR AND METHOD OF IDENTIFYING CAUSATION OF UNDESIRED NON-LINEAR INTERMODULATION INTERFERENCE

CROSS-REFERENCE TO RELATED PATENT

The subject matter of the present invention is generally related to that of U. S. Pat. No. 3,564,447, titled "Apparatus for Simulating Intermodulation Distortion Created Between a Plurality of Radio Frequency Signals by Environmental Nonlinearities," issued Feb. 16, 1971 in the name of Walter M. Chase.

BACKGROUND OF THE INVENTION

In many communication system environments, a considerable number of radio frequency transmitters may be required to operate simultaneously on various different frequencies. Frequently, the environmental conditions include naturally occurring non-linear junctions and the transmitted or radiated energy is acted upon by the non-linear junctions in the generation of cross-products or intermodulation products between the various simultaneously transmitted frequencies. Unfortunately, the intermodulation products generate frequencies which may be the same, or nearly the same, as frequencies at which it is desired to receive information within the overall communication system. The result is that the non-linear intermodulation interference makes it difficult to receive on those selected frequencies where substantial non-linear intermodulation interference occurs.

A typical example of this problem is a situation which often occurs aboard a Navy Ship. Because of the multitude of various communication links aboard such a ship, it is not uncommon for a number of transmitters, operating on different frequencies, to be transmitting simultaneously. Moreover, it has been found that there are a number of naturally occurring non-linear junctions typically aboard such ships. These non-linear junctions may occur at riveted and bolted metallic junctions, or at areas of rust or corrosion on cable armor, and at various other parts above deck.

Additionally, it is known that when current densities are high in a ferromagnetic material such as a ship's hull, the material of the hull acts in a non-linear fashion. Consequently, severe intermodulation products may be generated where radiated energy from any combination of transmitters aboard a ship is intercepted by any portion of a ship's structure including one or more of the naturally occurring non-linear junctions. These non-linear intermodulation interference signals are then radiated and will be received by the ship's receivers which are part of the communication system. When one of the intermodulation products coincides with one of the carrier frequencies on which it is desired to receive incoming messages, it may be extremely difficult, if not impossible, to decipher the incoming intelligence because the non-linear intermodulation interference effectively masks or jams the receiving frequency.

In a situation such as that described hereinbefore, as may occur aboard a Navy ship where interference-free reception is mandatory, it becomes highly advantageous to be able to determine and also to anticipate the source of non-linear intermodulation interference; further, it is highly advantageous to be able to either determine the choice of frequencies that are different from those transmitting frequencies which are the causation of the intolerable non-linear intermodulation interference, or to determine the selection of a receiving frequency which is not subject to interference, jamming, or masking by the products of such non-linear intermodulation interference. Accordingly, it is desirable that a method and means be devised for rapidly and accurately identifying which of a plurality of known radio frequency sources contributes significantly as a primary causation of undesired non-linear intermodulation interference.

In the prior art, systems were devised which simulated the intermodulation interference products developed aboard a Navy ship, for example, by the technique including the generation of a plurality of frequencies from a like plurality of radio frequency signal generators which were discrete, separate, and distinct from the actual transmitters in the communications systems involved. Then, in that prior art concept, a broadband linear amplifier produced amplified representations of the signals developed by the signal generators; the amplified signals were fed to a passive or non-active non-linear mixing device having a particular type of predetermined operative characteristic. The passive non-linear mixing element produced an approximation of the type of intermodulation interference which might be generated in the actual environment by the radiation of energy at various frequencies from the transmitters involved and the subsequent interception of that energy by actual, existent non-linear elements such as metallic joints, etc. on the ship.

A radio frequency monitoring element such as a frequency spectrum analyzer then received the mixed signals from the passive non-linear device for observation and identification of the results of the simulated intermodulation interference. One of the disadvantages of such a prior art system which, incidentally, was of the type disclosed in the previously referenced U.S. Patent, was that for each transmitting frequency involved, a duplicate, comparable type of signal was required to be generated in a separate signal generator, Thus, the actual transmitters were completely separate, independently operative, and apart from the source of the signals used to approximate and simulate the intermodulation interference caused by those transmitters. Obviously, this type of prior system had the inherent disadvantage of necessitating the determination of which radio frequency transmitters were operative and which were not, and thereafter ensuring that onl thos signal generators be activated which produced frequencies corresponding to the frequencies of those transmitters which were operative at that particular time.

Moreover, as various equipments were changed from one transmitting only those frequency to another, as might be necessitated for a number of different reasons typical of communication systems, the prior art simulators were required to make comparable changes in order to affect a reasonably accurate simulation of the intermodulation interference produced by such transmitting apparatus. Further, prior art systems of the type disclosed in the previously referenced U. S. Patent, employed a passive non-linear mixing device which was limited in the range of amplitudes of signals which it could accept. Additionally, a passive non-linear mixing device is not particularly adapted to mix very strong signals with very weak signals. For these and other reasons, the underlying and inherent weakness of such prior art systems was that they were capable of producing at best only a reasonable approximation of the real intermodulation interference which would actually be produced in the environment by the plurality of transmitters such as might be found on board ship, for example.

Accordingly, it is highly desirable that an intermodulation interference simulator be devised which more accurately generates the intermodulation products developed in an actual environment involving a multitude of transmitters and non-linear elements; it is equally desirable that such a method and system be capable of accepting signals over a broad range of amplitudes and have the ability to mix very strong signals with very weak signals to more nearly and accurately reproduce the intermodulation spectrum products as they occur in the real world.

Additionally, it is highly desirable that such a system and method be adapted to accept an independently generated signal of selectively variable frequency for determining whether or not, if such a frequency were transmitted, it would unacceptably interfere with one or more receiving frequencies.

SUMMARY OF THE INVENTION

The present invention conceives a method and means by which one or more sources of known radio frequency signals may be identified as a significant causation of undesired non-linear intermodulation interference such as might, for example, undesirably interfere with the reception of the signals and intelligence at a particular frequency.

Where a radiated signal of a frequency $f_1$ is intercepted by a non-linear element it will be found that the non-linear element develops signals which will contain not only the fundamental frequencies $f_1$ but also frequencies which are harmonically related to $f_1$; that is, frequencies such as $2f_1$, $3f_1$, $4f_1$ . . . etc. If two frequencies $f_1$ and $f_2$ which are non-harmonically related are intercepted by the non-linear element, the output will contain not only the harmonic frequencies $2f_1$, $3f_1$, $4f_1$ . . . etc. and $2f_2$, $3f_2$, $4f_2$ . . . etc. but also the sum and difference frequencies which are related to the fundamentals in the following manner;

| | |
|---|---|
| $f_1 \pm f_2$ | $3f_1 \pm f_2$ |
| $2f_1 \pm f_2$ | $f_1 \pm 3f_2$ |
| $f_1 \pm 2f_2$ | $3f_1 \pm 2f_2$ |
| $2f_1 \pm 2f_2$ | $2f_1 \pm 3f_2$, etc. |

These frequencies are called the intermodulation products or cross products. The coefficients of fundamental signals are always integral. The sum of the absolute values of the coefficients of the fundamentals is the order of the intermodulation products, i.e., $f_1 + f_2$ and $f_1 - f_2$ are both second order products and (assuming a third fundamental $f_3$) $f_1 + f_2 + f_3, f_1 - f_2 - f_3, 2f_1 + f_3$ are all third order products. These are the types of intermodulation products and signals which the present invention simulates.

The steps of the method of the present invention contemplate generating derivative signals commensurate with each of the known radio frequency sources and then non-linearly amplifying and mixing those derivative signals to produce composite signals having spectrally expanded frequency content. The composite signals are then separated into their frequency components for indicating the amplitude of each such component. Thereafter, each of the derivative signals is separately disconnected in turn for positive identification of that transmitted frequency which is the primary causation of the intermodulation interference component coincident in frequency with the selected frequency at which it is desired to receive intelligence and communication information.

Additionally, the method contemplates the step of adding a signal source of adjustably variable frequency to the derivative signals to as to simulate an additional transmitted frequency at any selectable frequency and thereby identify a possible alternate transmitting frequency which will not unduly interfere with that frequency at which it is desired to receive communications and intelligence. This is accomplished by adding the signal source to the mixed derivative signals and ascertaining whether it produces a resultant component of such amplitude as would undesirably and unacceptably interfere with the receiving frequency.

The apparatus for implementing the method of the present invention may preferably comprise a means for generating the derivative signals from the known radio frequency sources by a current transformer electromagnetically coupled to the output of each of the transmitters to thereby produce a signal of commensurate frequency as a function of each of the known radio frequency sources. The derivative signals are then amplified in a broadband non-linear amplifier which also performs like the function of mixing the signals, as well as spectrally expanding their frequency content so as to simulate non-linear intermodulation interference caused by actual radiation from the known radio frequency sources.

The non-linear amplifier of the present invention preferably operates to non-linearly generate a spectral range of additional harmonic frequencies such as may be affected by clipping the input signals, for example. This produces interaction between a great plurality of different frequencies as well as beat frequencies, i.e., the sum and difference frequencies, simulating intermodulation interference as is caused in the actual environment when transmissions are intercepted. For instance, as a sinusoidal waveform is clipped by operation in the saturation or cutoff region, it more nearly approximates a square waveform and thus it includes harmonic frequency components of much higher frequencies than its fundamental frequency. The non-linear amplifier of the present invention contemplates non-linear operation and the significant extension of the breadth of frequency spectral range in the manner described hereinbefore.

A switch means is employed for connecting the derivative signals as inputs to the amplifier and such switch means is adapted to be operative for selectively disconnecting any of the derivative signals so that when the resultant outputs from the non-linear amplifier are fed into a broadband frequency discriminating means which separately indicates the amplitude of each discrete frequency component of the amplifier outputs, each derivative signal can be disconnected separately from the apparatus and in that manner the frequency which is the causation of an undesirable bon-linear intermodulation interference product can be positively identified.

Thereafter, an alternate frequency for transmitting can be substituted for use by that particular transmitter which produces the offending frequency.

As yet another alternative, a substitute frequency can be chosen for the receiving apparatus, such frequency being selected as a result of a positive indication from the broadband frequency discriminating means that no sizeable interferring non-linear intermodulation products will be developed at that frequency by the then operative combinations of transmitting apparatus.

The apparatus implementing the method and concept of the present invention employs an active non-linear device in the form of a non-linear amplifier which is capable of accepting signals over a wide range of amplitudes, which desirable operative characteristic was not true of the passive type of non-linear mixing device employed in prior art systems.

Moreover, the method and apparatus of the present invention derives its signals from the actually transmitted signal sources so that only those transmitters which are operative at any particular time produce simultaneous derivative signals. Further, when such transmitters change from one frequency to another, as is frequently the case in actual operations, the change is instantly and automatically reflected in the commensurate derivative signal.

An additional advantage of employing a non-linear amplifier, rather than a passive non-linear device, is that the non-linear amplifier is entirely capable of effectively mixing very strong signals with very weak signals, whereas a passive device lacks this capability. In addition, because the intermodulation spectrum which is developed in accordance with the concept and method of the present invention is derived initially from the known radio frequency sources and the subsequent non-linear generation of frequency harmonics, beat frequencies, etc. and their manifold intermodulation products, it is a more accurate and exact duplicate of that which is generated in the real world and in the actual environment; therefore, it is more reliable, particularly for purposes of choosing alternate frequencies which are indicated to be relatively trouble-free for either transmission or reception insofar as non-linear intermodulation interference problems are concerned.

It is a primary object of the present invention to provide a method and means of simulating intermodulation interference created from a plurality of known radio frequency sources for the purpose of identifying which source or sources are the primary causation of such undesired interference and also for identifying alternative transmission or reception frequencies.

A further most important object of the present invention is to simulate such intermodulation by non-linear amplification which expands the frequency spectral range by the generation of extensive harmonic components.

Yet a further object of the present invention is the non-linear amplification of such harmonic components, including their sum and difference frequencies for simulating intermodulation interference and distortion.

A concomitant object of the present invention is the generation of such simulated intermodulation interference from derivative signals generated from the plurality of known radio frequency sources.

Another important object of the present invention is the provision of a source of selectively variable frequency signals for addition to the derivative signals as a method of indicating those alternate or substitute frequencies which may be radiated without undue intermodulation interference effects.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figures 1, 2, 2A:
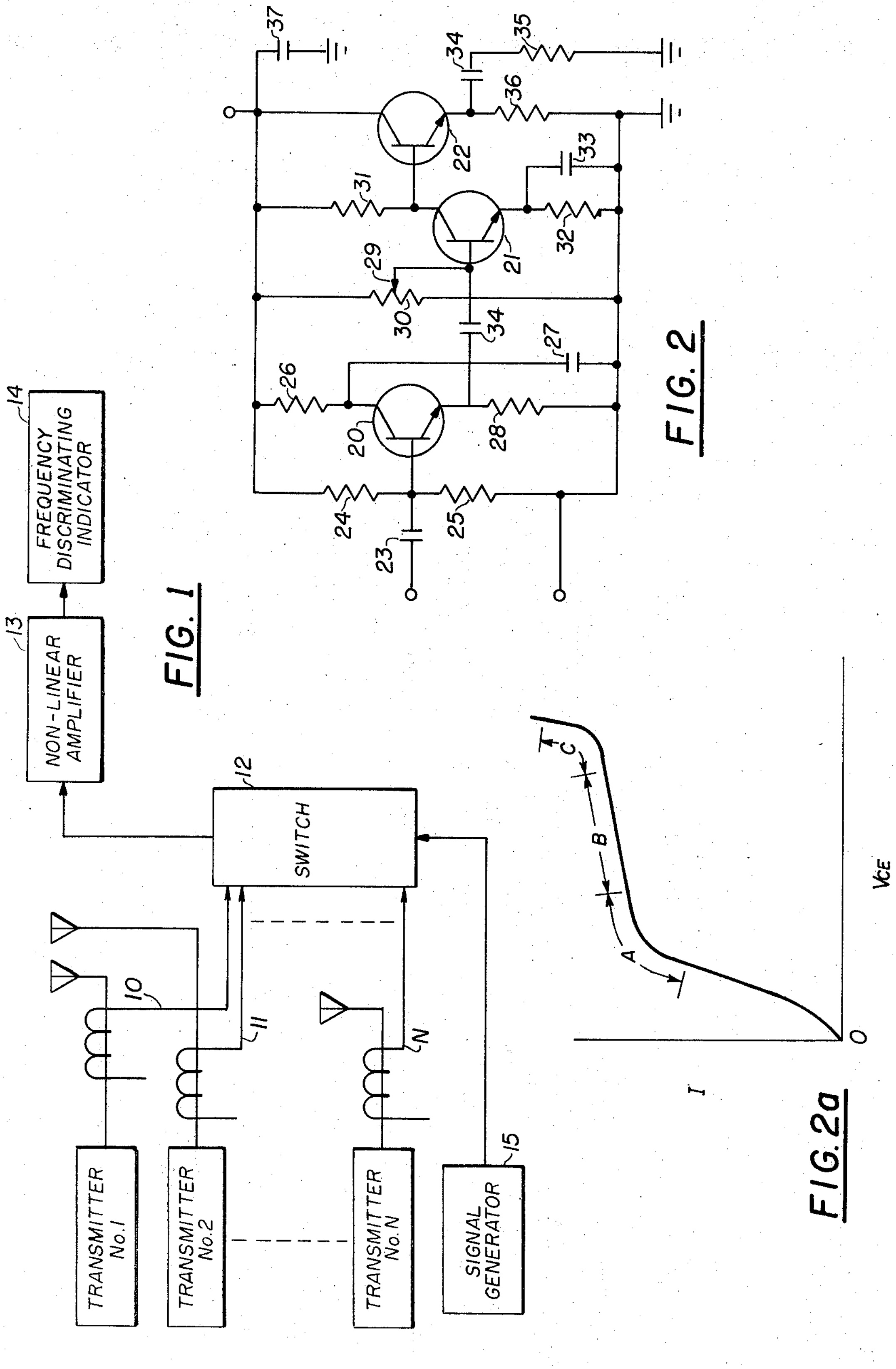
FIG. 1 is a schematic block diagram of a preferred embodiment of the present invention.
FIG. 2 is a detailed schematic wiring diagram of a non-linear amplifier employed in a preferred embodiment of the present invention.
FIG. 2*a* is a graphic representation of the operative characteristics of a transistor which may be employed in the preferred embodiment of the present invention.

As shown in FIG. 1, a plurality of known radio frequency sources such as transmitters No. 1 through N, radiate energy at various different frequencies. Such radiations, when intercepted by non-linear junctions as may occur in frequent locations aboard a Navy ship, for example, produce non-linear intermodulation interference effects which are highly detrimental to the reception of yet other transmitted communications and intelligence and therefore undesirably interfere with the proper operation of communications.

Appropriate means such as a current transformer may be employed to develop derivative signals of commensurate frequencies and also as a function of each of the plurality of the known radio frequency sources. Such electromagnetic coupling may be affected by an appropriate current transformer as is shown in FIG. 1 at 10 for transmitter No. 1 and at 11 for transmitter No. 2. Similar electromagnetic coupling for each of the plurality of transmitters which may be present in a communication system aboard ship are provided as necessary. Thus, derivative signals are generated from the output of each of the plurality of known frequency sources.

It should be noted that one of the advantages of the present invention is that such electromagnetic coupling with the output of the transmitter to the antenna in no way disturbs the normal operation of the transmitters and the radiated signals and is therefore highly advantageous.

The plurality of derivative signals thus generated are fed to a switch means 12. The switch means 12 connects its output to a non-linear amplifier 13 where the derivative signals are combined, mixed, and non-linearly amplified in amplitude and expanded in frequency content. The composite output of the non-linear amplifier, which simulates intermodulation interference as developed in the real environment by reason of the radiated energy from the transmitters No. 1 through N, is then fed to a frequency discriminating indicator 14.

Such a frequency discriminating device may take the form of a frequency analyzer or any suitable comparable equipment which is capable of separately indicating the amplitude of each discrete frequency component of the resultant output received from the broadband non-linear amplifier 13.

The switch means 12 is operative for selectively disconnecting any one or more of the derivative signals which it receives as inputs. In this manner, the disconnection of any one or more particular derivative signals, and the consequent elimination of their contribution to the composite simulated intermodulation interference signal developed by the non-linear amplifier 13, will have a consequent effect on the frequency vs. amplitude distribution of the discrete frequency components indicated by the frequency discriminating indicator 14.

Accordingly, any significantly interfering frequency developed by reason of intermodulation interference can be identified readily and its causation established as being due to one or more of the derivative signals which are generated from each of the known frequency sources such as the transmitters 1 through N.

One of two corrective measures may then be taken; one alternative is to eliminate the offending transmitted frequency by taking the particular transmitter off the air or by changing it to another transmitter frequency. A second alternative is provided through the use of a signal generator 15 which is capable of selectively generating a signal of frequency as desired. Such a selectively determined frequency is generated and fed into the switch means 12 together with the other derivative signals, and the combined composite is non-linearly amplified in the amplifier 13. The frequency discriminating indicator 14 can then be used to determine whether or not the frequency as selectively generated by the signal generator 15, is contributory to an intolerable amplitude of intermodulation interference at a particular frequency. The selection of an appropriate frequency by the use of signal generator 15, which is additively combined with the known radio frequency sources, is an indication of whether or not such selected frequency generated by signal generator 15 may be employed as an alternative or substitute frequency without undue intermodulation interference effects upon a particular frequency which it is desired to use for reception in the communication system.

It will be readily appreciated by those skilled and knowledgeable in the pertinent arts that the concept of the present invention contemplates the employment of a non-linear amplifier, as contrasted to the linear amplifier employed in the referenced patent; moreover, the non-linear amplifier of the present invention is, of course, an active device as contrasted to the passive non-linear device employed in the referenced patent.

Further, the concept of the present invention inherently requires that the input signals representative of the radiated frequencies which are basically the cause of the undesirable intermodulation interference, be derived from the actual radio frequency sources themselves as may be accomplished by an appropriate current transformer means electromagnetically coupled to each transmitter-antenna connection without interfering in any way with the operation of the transmitters or the radiated signals.

FIG. 2 illustrates a non-linear amplifier which may be used in a preferred embodiment of the present invention. The non-linear amplifier as illustrated in FIG. 2 comprises three transistor stages each of which may typically employ an RCA 2N3600 type transistor, for example.

FIG. *2a* is a graphical illustration of the transistor's operative characteristic comprising collector-emitter voltage as depicted along the abscissa vs. the collector current on the ordinate scale. The regions A and B, as illustrated in FIG. 2a, are the two non-linear portions of the collector-emitter voltage vs. collector current characteristic.

The transistors 21 and 22, as employed in the circuit of FIG. 2, are biased to be operative in region A or B of the operative characteristic illustrated in FIG. 2a producing non-linear operation; the transistor 20 is biased to be operative in region C, which is the relatively linear region of the operative characteristic.

The first stage of the non-linear amplifier illustrated in FIG. 2 is an emitter-follower input stage comprised principally of the transistor 20. An emitter follower is employed because a high input impedance is desirable so that the output impedance of the RF switching means and the source of the derivative signals is not disturbed. The current drive provided by the emitter-follower is necessary for the next transistor stage in the non-linear amplifier because that stage may have a relatively low input impedance when it is biased in the operative region as previously mentioned, i.e., thc non-linear region A of the characteristic curve as shown in FIG. *2a.*

The signals from the switching means 12 of FIG. 1 are coupled into the input of the non-linear amplifier of FIG. 2 through an appropriate coupling capacitor 23. The coupling capacitor 23 is also connected to the common connection point between resistors 24 and 25, which common connection point is also connected to the base of transistor 20.

The resistors 24 and 25 operate to divide a B+ voltage of 22 volts dc so that a potential of approximately 8.15 volts is applied to the base of transistor 20 at the same time that the input signal is applied, thus biasing transistor 20 in the linear region of the characteristic curve as designated by the letter C in FIG. *2a.*

A resistor 26, connected from B+ to the collector of the transistor 20, serves to limit the dc current through the collector-emitter of the transistor and provides a voltage drop, reducing the B+ from 22 volts dc to 15 volts. Fifteen volts dc is the maximum collector-emitter voltage which the particular type of transistor employed at 20 will tolerate and still function in the C region of the characteristic curve as shown in FIG. *2a.*

A capacitor 27 is connected from the collector of transistor 20 to ground and bypasses the input signal which would otherwise be developed across the resistor 26, thus allowing the transistor 20 to function as an emitter-follower, i.e., a unity gain amplifier.

A resistance 28, connected from the emitter of the transistor 20 to ground, develops the input signal applied to the base of transistor 20 and provides the output of the emitter-follower stage. The output is a signal which is a duplicate of the input signal, less the base-emitter voltage drop of the transistor, but increased in current by the gain (forward current transfer ratio) of the transistor.

The next stage of the non-linear amplifier, which principally is comprised of the transistor 21 and its associated components, is employed to generate the non-linear frequency spectrum characteristics of the non-linear amplifier. The essential aspects of such non-linear operation are disclosed and described in the text book "Active Networks" by V. Rideout, published by Prentice Hall, New York in 1954, particularly at sections 8.6 through 8.9 comprising pages 230 through 236 of that publication.

The non-linear stage comprised of transistor 21 operates on a bias voltage produced by the selective positioning of the variable tap 29 of resistive element 30 which is connected from a source of B+, 22 volts dc, to ground. The resistive element 30 and its variable tap 29 may be adjusted to produce bias voltages at the base of transistor 21 that will cause the transistor 21 to operate either in region A or region B of the characteristic operative curve illustrated in FIG. 2a.

Assuming that the transistor 21 is operated in region B, the current through the transistor 20 must be limited by appropriate resistors to where the device will not be damaged or destroyed. Resistive elements 31 and 32 connected to the collector and emitter, respectively, of transistor 21 function to limit the current through the collector-emitter circuit of transistor 21. The resistive element 32 also acts in combination with a parallel connected capacitor 33 to perform an emitter tuning function in controlling the operation of transistor 21 so that it will only amplify or generate signals up to about 150MHz. By increasing the value of the capacitor 33, the spectrum of non-linear frequency distribution may be vastly increased up to approximately 2GHz because the tuning elements will bypass more of the signals generated by transistor 21, thus allowing those signals to be produced at the collector of the tansistor 21.

The output signals generated by the emitter-follower stage of transistor 20 are applied to the base of the non-linear amplification stage 21 through a suitable coupling capacitor 34. The signals thus received are then acted upon non-linearly as previously described to produce the non-linear frequency spectrum by a process similar to that which occurs in the description of the previously noted text.

The third stage of the non-linear amplifier preferably employed in practicing the present invention, is an output driver stage which comprises an emitter-follower type of circuit including transistor 22. The output of the non-linear amplification stage comprising transistor 21 is developed at its collector which is connected to the base of the output driver stage comprising transistor 22. The bias for the operation of the output driver stage of transistor 22 is derived from the voltage drop across the resistive element 30. Therefore, the bias voltage applied to the base of transistor 22 is the bias voltage developed at the variable tap of the resistive element 30, plus the potential developed across the base-collector junction of transistor 21. As a result, transistor 22 is also operative in a non-linear region, but differs from the operation of transistor 21 by reason of the potential drop across the base-collector of transistor 21.

Therefore, the transistor 22 will, in a sense, compound the non-linear amplification effect in that it acts non-linearly on the already non-linearly amplified and frequency expanded signals developed by the transistor stage 21 in accordance with the non-linear operation as described in the previously referenced text. Accordingly, the transistor stage 22 has two primary functions; firstly, it furnishes the requisite current to drive a 50 ohm load in a typical embodiment and, secondly, it acts as a second non-linear stage providing high current, low impedance output.

In operation, the signals comprised of the non-linear frequency spectrum characteristics as developed at the collector of transistor 21, are applied to the base of the transistor 22 and amplified in power by a factor which is determined by the forward current transfer ratio of the 2N3600 type of transistor.

The signal developed at the emitter of transistor 22 may be coupled through a suitable coupling capacitor 34 to load resistor 35 to provide the input to a frequency discriminating device such as a spectrum analyzer, for example. A resistive element 36 connected from the emitter of transistor 22 to ground limits the collector-emitter current of transistor 22 to insure proper operation.

Those skilled and knowledgeable in the pertinent arts will readily appreciate that the concept of the present invention contemplates a method and a means for simulating highly reliable and realistic intermodulation interference signals directly from known radio frequency sources which generate such unwanted intermodulation interference in the actual environment where they are radiated. The use of non-linear amplification and, more particularly, in the form shown in a preferred embodiment of FIG. 2, enhances the operative characteristics of the present invention in that it permits the ready acceptance of signals varying significantly in amplitude such as was not possible with known prior art systems.

Moreover, the non-linear operation of the present invention develops a broad spectrum of frequency components which are harmonically related and combined in sum and difference beat frequencies to very accurately approximate the intermodulation interferences which occur in real world non-linear environmental elements.

Since the nature of the present invention inherently requires the conception of a method comprising a particular and novel sequence of steps, the invention comprises dual aspects as disclosed and in a new method or process as well as a unique combination of apparatus to achieve its highly desirable results.

Obviously many modifications and variations of the present invention are possible in the light of the above teachings. It is therefore to be understood that within the scope of the appended claims the invention may be practiced otherwise than as specifically described.

What is claimed is:

1. An apparatus for simulating intermodulation interference created from a plurality of known radio frequency sources comprising:

a means operatively coupled to each of said plurality of known radio frequency sources and responsive thereto for generating a like plurality of derivative signals of commensurate frequencies, each as a function of one of said plurality of known radio frequency sources;

switch means connected to receive all said plurality of derivative signals, and being operative for selectively disconnecting any of said plurality of derivative signals;

a broad-band non-linear amplifier connected to receive the outputs of said switch means comprising said derivative signals for non-linear spectral expansion of the frequency content of said derivative signals to produce composite output signals simulating non-linear intermodulation interference caused by radiation from said sources; and broad-band frequency discriminating means connected to receive the resultant outputs of said amplifier for separately indicating the amplitude of each discrete frequency component of said resultant outputs.

2. An apparatus for simulating intermodulation interference created from a plurality of known radio frequency sources as claimed in claim 1 and including a signal source of selectively variable frequencies connected to said switch means for providing an additional input to said amplifier.

3. An apparatus for simulating intermodulation interference created from a plurality of known radio frequency sources as claimed in claim 1 wherein said radio frequency sources are transmitters and said means for generating derivative signals comprises a broad-band current transformer electromagnetically coupled to the outputs of said transmitters.

4. An apparatus for simulating intermodulation interference created from a plurality of known radio frequency sources as claimed in claim 1 wherein said amplifier includes means for adjustably varying said non-linear spectral expansion of the frequency content of the derivative signals.

5. A method of identifying which of a plurality of known radio frequency sources is a primary causation of undesired non-linear intermodulation interference at a selected frequency comprising the steps of:

generating derivative signals of commensurate frequency from the known radio frequency sources;

non-linearly amplifying, spectrally expanding, and mixing the derivative signals to produce composite signals;

separating the frequency components of the composite signals for indicating the amplitude of each such component;

separately disconnecting each derivative signal in turn for determining which of the plurality of known radio frequency sources causes intermodulation interference at the selected frequency.

6. A method of identifying which of a plurality of known radio frequency sources is a primary causation of undesired non-linear intermodulation interference at a selected frequency as claimed in claim 6 which includes the step of adding a signal source of adjustably variable frequency to the derivative signals.

* * * * *